US012752138B2

(12) United States Patent
Dal Ben

(10) Patent No.: US 12,752,138 B2
(45) Date of Patent: Oct. 6, 2026

(54) SCREENING MACHINE FOR SCREENING SOLID MATERIAL

(71) Applicant: PAL S.R.L., Ponte di Piave (IT)

(72) Inventor: Antonio Dal Ben, Ponte di Piave (IT)

(73) Assignee: PAL S.R.L., Ponte di Piave (IT)

( * ) Notice: Subject to any disclaimer, the term of this patent is extended or adjusted under 35 U.S.C. 154(b) by 228 days.

(21) Appl. No.: 18/567,995

(22) PCT Filed: Jun. 7, 2022

(86) PCT No.: PCT/IT2022/050163
§ 371 (c)(1),
(2) Date: Dec. 7, 2023

(87) PCT Pub. No.: WO2022/259280
PCT Pub. Date: Dec. 15, 2022

(65) Prior Publication Data

US 2024/0238630 A1 Jul. 18, 2024

(30) Foreign Application Priority Data

Jun. 8, 2021 (IT) ........................ 102021000014939

(51) Int. Cl.
*A62C 3/06* (2006.01)
*A62C 35/13* (2006.01)
*B07B 1/00* (2006.01)

(52) U.S. Cl.
CPC ................ *A62C 3/06* (2013.01); *A62C 35/13* (2013.01); *B07B 1/00* (2013.01)

(58) Field of Classification Search
USPC ..................................................... 169/70, 16
See application file for complete search history.

(56) References Cited

U.S. PATENT DOCUMENTS

| | | | | |
|---|---|---|---|---|
| RE28,397 | E * | 4/1975 | Boyd | A62C 3/04 118/306 |
| 8,523,963 | B2 | 9/2013 | Bullinger et al. | |
| 2014/0090859 | A1 | 4/2014 | Sauer et al. | |

FOREIGN PATENT DOCUMENTS

| | | | |
|---|---|---|---|
| CN | 1557572 | A | 12/2004 |
| DE | 102018115221 | A1 | 1/2020 |
| WO | 2020174100 | A1 | 9/2020 |
| WO | 2022259280 | A1 | 12/2022 |

OTHER PUBLICATIONS

International Search Report and Written Opinion for corresponding International PCT Application No. PCT/IT2022/050163, dated Sep. 30, 2022.

* cited by examiner

*Primary Examiner* — Christopher S Kim
(74) *Attorney, Agent, or Firm* — K&L Gates LLP

(57) ABSTRACT

Screening machine (10) for screening solid materials, comprising a screening box (12) shaped so as to have a plurality of perimeter walls (16, 17, 19, 21), an upper wall (15) and an opposite bottom wall (13), in order to make said solid materials to be screened flow inside it. Said screening machine (10) comprises at least one active anti-propagation device (24) integral with said screening box (12).

14 Claims, 2 Drawing Sheets

SCREENING MACHINE FOR SCREENING SOLID MATERIAL

CROSS-REFERENCE TO RELATED APPLICATIONS

This application is a U.S. National Stage Entry under 35 U.S.C. § 371 of International Patent Application No. PCT/IT2022/050163, entitled SCREENING MACHINE FOR SCREENING SOLID MATERIALS, filed Jun. 7, 2022, which claims benefit of Italian Patent Application No. 102021000014939, filed Jun. 8, 2021, the entire disclosures of which are hereby incorporated by reference herein.

FIELD OF THE INVENTION

The present invention concerns a screening machine for screening solid materials, in particular of the type which could give rise to potentially explosive dust, such as for example small wood shavings, but is not limited to this.

BACKGROUND OF THE INVENTION

It is known that screening machines are normally provided with a screening box divided into compartments inside which screening surfaces are positioned on which the material to be sieved or screened is made to flow.

Furthermore, the screening box normally has a certain downward inclination from an inlet zone to an outlet zone and has a length of up to about ten meters or more.

The materials treated by screening machines can be of various types and some of them, such as wood shavings, give rise to dust which, when mixed with air, can become explosive. In particular, this phenomenon can develop with greater probability when the wood shavings come from a dryer disposed upstream of the screening machine and are very small, for example less than 6 mm, to be subsequently treated to make panels. In fact, in these shavings, there is normally a significant amount of wood dust (up to 15%) with sizes of less than 0.5 mm which, in a stoichiometric ratio with the air inside the compartments of the screening machine, can become explosive.

The screening machine, especially if it is of the oscillating type, has to therefore be adequately protected with suitable devices in order to prevent the propagation of possible explosions that can occur inside it, for example in one of the two compartments, upper and lower, through which the material passes.

In order to protect the machine from explosions, there are currently two types of protection devices: active and passive.

Active protection devices comprise chemical suppressors, or extinguishers, which suppress the explosion when first ignited, detected by suitable sensors, by injecting a chemical extinguishing agent.

The chemical suppressors, positioned on supports outside the screening box, are connected to it by means of flexible pipes. The use of chemical suppressors positioned on supports outside the screening box and the use of flexible pipes outside the screening box naturally entails an increase in the bulk and complexity of the screening machine.

In the case of an oscillating screening machine, moreover, since the screening box oscillates, the flexible pipes are subjected to big movements and are stressed to fatigue. Their duration and reliability over time is limited, to the point that in the legislation of some countries it is obligatory to replace them every six months.

There is therefore a need to perfect a screening machine for screening solid materials which can overcome at least one of the disadvantages of the state of the art.

In particular, one purpose of the present invention is to provide a screening machine which is equipped with active protection means which allow to have less impact on the overall bulk, the complexity and maintenance of the screening machine compared to what happens in known screening machines.

Another purpose of the present invention is to provide a screening machine with active protection means that are reliable, safe and allow to cover the entire volume of the screening box with an extinguishing jet, that is, to effectively reach every compartment provided inside the machine in which there is a risk of generating an explosive atmosphere, such as for example in the case of mixtures of wood dust and air.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, and in order to resolve the technical problem in a new and original way, also achieving considerable advantages with respect to the prior state of the art, a screening machine for screening solid materials comprises a screening box shaped so as to have a plurality of perimeter walls, an upper wall and an opposite bottom wall, in order to make the solid materials to be screened flow inside it.

In accordance with one aspect of the present invention, the screening machine comprises at least one active type anti-propagation device integral with the screening box. By anti-propagation device we mean a device that prevents the establishment, but above all the propagation, of explosive atmospheres or flames inside the screening box.

In accordance with another aspect of the present invention, the at least one anti-propagation device comprises at least one pipe provided with a plurality of delivery nozzles for delivering an extinguishing chemical substance in fluidic communication with one or more compartments of the screening box, and at least one chemical suppressor for containing the extinguishing chemical substance in fluidic communication with the pipe.

Advantageously, the present screening machine equipped with at least one anti-propagation protection device of the active type allows to have less impact on the overall bulk, on the complexity and maintenance of the screening machine compared to what happens in known screening machines. This anti-propagation protection device, in fact, is equipped with at least one chemical suppressor attached directly to a wall of the screening box, thus avoiding the use of flexible pipes or supports external to the screening box.

The anti-explosion protection device is also reliable and safe, and it allows, thanks to how it is configured and disposed, to cover the entire volume of the screening box with an extinguishing jet, that is, to effectively reach every compartment provided inside the machine in which there is the risk of generating an explosive atmosphere, such as for example in the case of mixtures of wood dust and air.

In accordance with another aspect of the present invention, the at least one pipe is attached to at least one of the perimeter walls of the screening box.

In accordance with another aspect of the present invention, the at least one chemical suppressor is attached to the upper wall of the screening box.

In accordance with another aspect of the present invention, the at least one pipe comprises segments dedicated to each of the delivery nozzles. In this way, for example, it is possible to supply the extinguishing chemical substance to the nozzles in a selective manner. For example, it is possible to choose whether to send the chemical substance to one or more nozzles, to alternate the operation of the delivery nozzles, or other. These delivery modes are useful if there is a need to compartmentalize the anti-propagating/extinguishing action only to one or more compartments, or to specific zones of such compartments.

In accordance with another aspect of the present invention, the at least one pipe is disposed inside the screening box, attached to an internal surface of at least one of the perimeter walls.

In accordance with one variant, the at least one pipe is disposed outside the screening box, attached to an external surface of at least one of the perimeter walls.

In accordance with another aspect of the present invention, the screening machine comprises a plurality of the anti-propagation devices provided with a plurality of chemical suppressors equipped with respective pipes.

In accordance with another aspect of the present invention, the anti-propagation devices are positioned in proximity to the lateral walls of the opposite perimeter walls of the screening box.

In accordance with another aspect of the present invention, the at least one pipe is disposed along at least one of the lateral walls of the screening box. Furthermore, the delivery nozzles are disposed at different heights along the lateral walls.

In accordance with another aspect of the present invention, each of the delivery nozzles is disposed between two screening surfaces, or between one screening surface and the upper wall, or between one screening surface and the bottom wall.

In accordance with another aspect of the present invention, the chemical suppressors are disposed in an array on the upper wall.

In accordance with another aspect of the present invention, the screening machine comprises a first row of chemical suppressors positioned in proximity to a first one of the lateral walls, and a second row of chemical suppressors positioned in proximity to a second one of the lateral walls.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
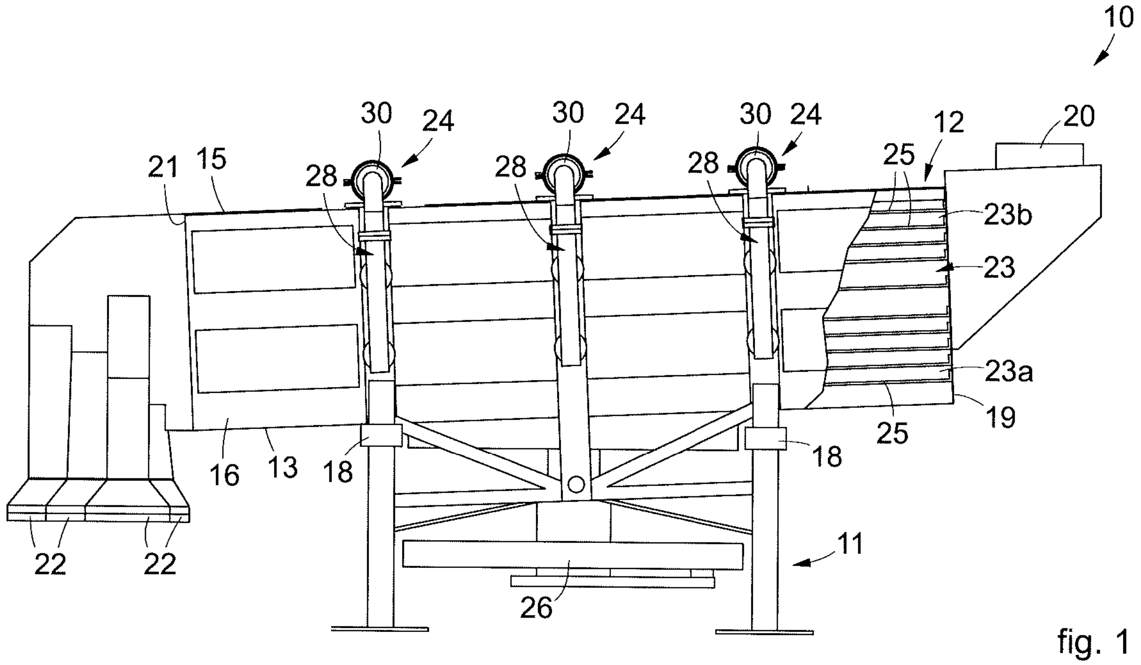
FIG. 1 is a lateral view of a screening machine for screening solid materials according to the present invention.

We must clarify that in the present description the phraseology and terminology used, such as for example the terms horizontal, vertical, front, rear, upper, lower, internal and external, with their declinations, have the sole function of better illustrating the present invention with reference to the attached drawings and must not be in any way used to limit the scope of the invention itself, or the field of protection defined by the attached claims.

Before describing an embodiment of the present invention, we must also clarify that this must not be considered as limited in its application to the details of the construction and disposition of the components as described in the present description using the attached drawings. In fact, the present invention can take on other embodiments and can be obtained or executed in various other equivalent ways.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIGS. from 1 to 4, a screening machine 10 according to the present invention for screening solid materials, in particular of the type which could give rise to potentially explosive dusts, such as for example small wood shavings, although it is not limited to this, comprises a support structure 11 on which there is mounted a screening box 12 which is configured to make the solid materials to be screened flow inside it.

The screening box 12 substantially has the shape of a parallelepiped with a rectangular base and comprises a bottom wall 13, an upper wall 15 and four perimeter walls, in particular two lateral walls 16 and 17, a front wall 19, which is associated with an inlet compartment 20, or hopper, for the entry of the materials to be screened, and a rear wall 21 associated with a series of outlet ducts 22, which are used for the collection of the screened materials, possibly divided according to granulometry.

In the screening box 12 there are some compartments 23, divided into at least a lower compartment 23*a* and an upper compartment 23*b*, in which there are disposed screening surfaces 25 on which the solid materials to be screened can flow.

The screening box 12 has an inclination of a few degrees, for example from 1° to 45° with respect to a horizontal plane, so that the screening surfaces 25 are higher in the part that is close to the inlet compartment 20, in order to promote the displacement of the materials to be screened toward the outlet ducts 22.

The screening box 12 is mounted on the support structure 11 by means of elastic joints 18 so that it can oscillate.

On the support structure 11 there is installed a movement device 26 of a type known per se, which is connected to the screening box 12 in such a way as to give the latter an oscillatory movement such as to make the solid materials flow from the inlet compartment 20 to the outlet ducts 22.

The screening machine 10 is equipped with at least one anti-propagation device 24, advantageously of the active type, that is, capable of suppressing a possible explosion that were to occur in the screening box 12, for example caused by a sudden ignition, caused by self-combustion of the solid materials to be screened, when first ignited, detected by suitable sensors, through the injection of an extinguishing chemical agent.

Each anti-propagation device 24 comprises at least one pipe 28 provided with a plurality of delivery nozzles 29 for delivering an extinguishing chemical substance in fluidic communication with one or more of the compartments 23 of the screening box 12, and at least one chemical suppressor 30 for containing the extinguishing chemical substance, which is attached, in the example described here, to the upper wall 15 of the screening box 12, and which is in fluidic communication with the pipe 28. The chemical suppressor 30 can be, for example, a fire extinguisher attached to the upper wall 15 by means of attachment means 31, for example clamps or other systems of a known type, and which is connected to the pipe 28 by means of a suitable connector 32.

However, it is not excluded that the chemical suppressor(s) 30 of the anti-propagation devices 24 can also be associated with other walls, different from the upper wall 15, for example with the bottom wall 13 or with the lateral walls 16 and 17.

The pipe 28, preferably but not necessarily rigid, can be attached to one or both lateral walls 16 and 17 of the screening box 12 depending on the installation configuration chosen for the anti-propagation devices 24.

The lateral walls 16 and 17 can be provided with apertures 33, which allow access to the compartments 23 for the delivery of the extinguishing chemical substance through the delivery nozzles 29. The apertures 33 could also be replaced by holes made in the lateral walls 16 and 17 in correspondence with the delivery nozzles 29.

The delivery of the extinguishing chemical substance by the chemical suppressor 30 through the delivery nozzles 29 can occur automatically. In this case, suitable sensors 34 are installed inside the compartments 23 which are configured to detect the triggering of an explosion or a fire, and to send an activation signal at least to the delivery nozzles 29 that are responsible for that zone, for example a given compartment 23, or to the control unit thereof, if present.

Preferably, the pipe 28 comprises a plurality of delivery nozzles 29 for the delivery of the extinguishing chemical substance for each compartment 23 of the screening box 12. In this way, it is possible to protect both the lower compartment 23*a* and also the upper compartment 23*b* with maximum coverage.

Figure 4:
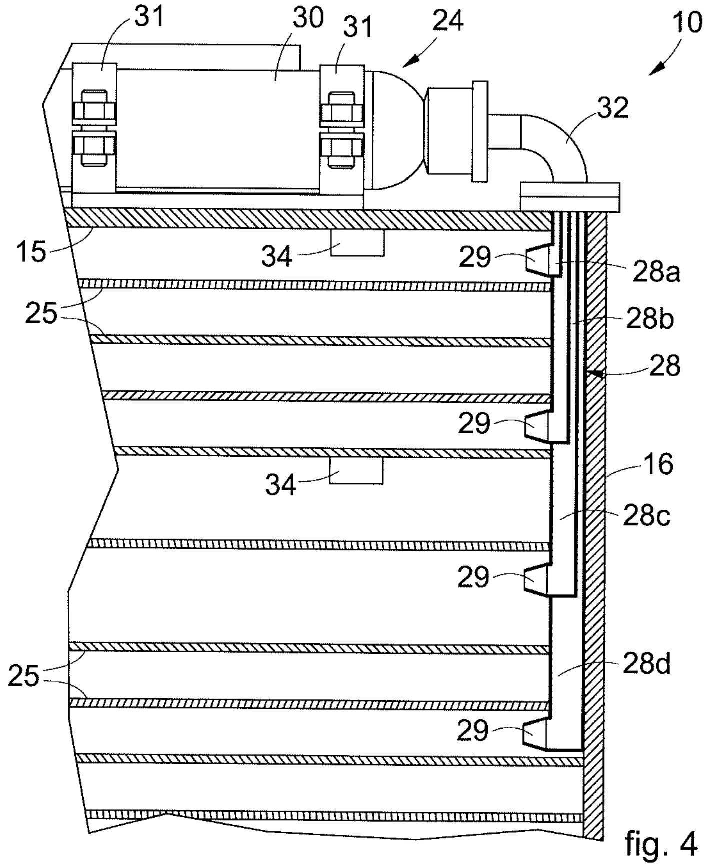
FIG. 4 is a section view and on a larger scale of a part of a screening machine according to a variant, in which an anti-propagation device can be seen disposed inside the screening box.

The pipe 28 can be divided into segments 28*a*, 28*b*, 28*c* and 28*d* dedicated to each of the delivery nozzles 29, see in particular FIG. 4. These segments 28*a*, 28*b*, 28*v*, 28*d* are separate and independent.

The pipe 28 can be integrated inside the screening box 12, therefore be disposed on an internal surface of the lateral wall 16, 17 to which it is attached, see in particular FIG. 4. The solution according to which the pipe 28 is associated with an internal surface of the lateral wall 16, 17 guarantees greater reliability and lower impact of the installation of the anti-propagation device 24 on the screening box 12.

Figure 2:
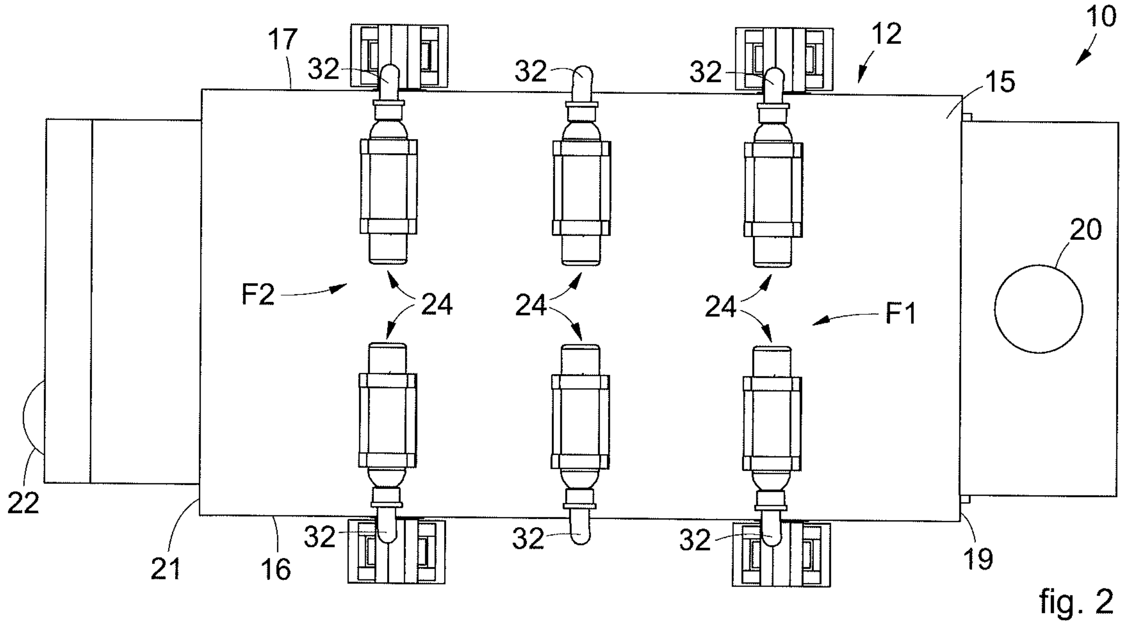
FIG. 2 is a plan view of the present screening machine.
Figure 3:
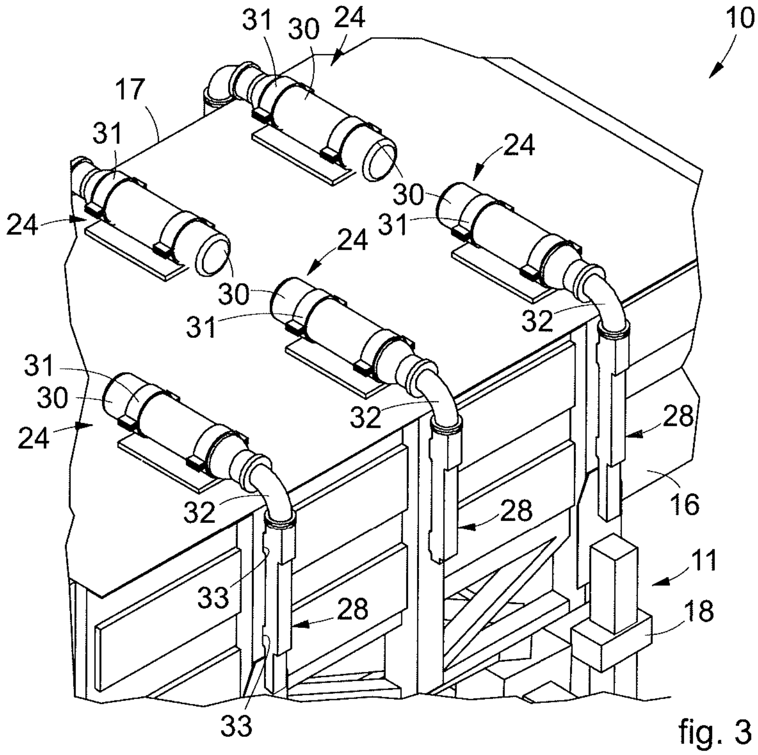
FIG. 3 is a partial three-dimensional view of the machine of FIGS. 1-2.

The pipe 28 could, however, also be positioned outside the screening box 12, therefore on an external surface of the lateral wall 16, 17 to which it is attached, as shown in FIGS. 1-3. The solution in which the pipe 28 is attached to an external surface of the lateral walls 16, 17 of the screening box 12 allows a more immediate access thereto, if replacement or maintenance interventions are required.

Alternatively or in combination with the above, the pipe 28 can be attached to the upper wall 15.

The screening machine 10 can comprise a plurality of anti-propagation devices 24 provided with a plurality of chemical suppressors 30 equipped with respective pipes 28, see for example FIGS. 1-3.

For example, it is possible to provide anti-propagation devices 24 positioned in proximity to both the opposite lateral walls 16 and 17 of the screening box 12, so as to deliver the extinguishing chemical substance from both sides of a given compartment 23.

The chemical suppressors 30 can be positioned in an array on the upper wall 15 of the screening box 12. For example, it is possible to provide a first row F1 of chemical suppressors 30 positioned in proximity to the lateral wall 16, and a second row F2 of chemical suppressors 30 positioned in proximity to the opposite lateral wall 17. The two rows F1 and F2 are schematically shown in FIG. 1 and each comprise, for example, three chemical suppressors 30.

The number and position of the chemical suppressors 30 with respective pipes 28 and delivery nozzles 29 can be chosen in such a way as to suitably cover the entire volume of the compartments 23 of the screening box 12 with the extinguishing jet, since in each compartment 23 an explosive atmosphere of wood dust-air can be generated between one screening surface 25 and the other.

In particular, the delivery nozzles 29 are advantageously disposed at different heights along the lateral walls 16 and 17 of the screening box 12, so as to cover all the compartments 23 in a uniform manner.

Furthermore, each of the delivery nozzles 29 of a same anti-propagation device 24 can be disposed between two screening surfaces 25, see FIG. 4. Other embodiments of the present invention provide that, in addition or alternatively, on the front wall 19 and/or on the rear wall 21, other anti-propagation devices 24 can be installed with the respective pipes 28 associated with the walls, internally and/or externally, so that the delivery nozzles 29 are directed toward both compartments 23 of the screening box 12.

It is clear that modifications and/or additions of parts may be made to the screening machine 10 as described heretofore, without departing from the field and scope of the present invention as defined by the claims.

In the following claims, the sole purpose of the references in brackets is to facilitate reading and they must not be considered as restrictive factors with regard to the field of protection claimed in the specific claims.

The invention claimed is:

1. Screening machine for screening solid materials, comprising a screening box shaped so as to have a plurality of perimeter walls, an upper wall and an opposite bottom wall, wherein said screening box comprises at least one explosion anti-propagation device, which is integral with said screening box, and wherein said at least one explosion anti-propagation device comprises at least one pipe provided with a plurality of delivery nozzles for delivering an extinguishing chemical substance in fluidic communication with one or more compartments of said screening box and at least one chemical suppressor for containing said extinguishing chemical substance in fluidic communication with said pipe, wherein the at least one chemical suppressor is a fire extinguisher attached to at least one of the walls of said screening box by means of attachment means and is connected to the at least one pipe by means of a connector.

2. Screening machine as in claim 1, wherein said at least one pipe is attached to at least one of said perimeter walls of said screening box.

3. Screening machine as in claim 1, wherein said at least one chemical suppressor is attached to said upper wall of said screening box.

4. Screening machine as in claim 1, wherein said at least one pipe comprises segments dedicated to each of the delivery nozzles.

5. Screening machine as in claim 1, wherein said at least one pipe is disposed inside said screening box, attached to an internal surface of at least one of said perimeter walls.

6. Screening machine as in claim 1, wherein said at least one pipe is disposed outside said screening box, attached to an external surface of at least one of said perimeter walls.

7. Screening machine as in claim 1, wherein said screening box comprises at least one additional explosion anti-propagation device comprising at least one pipe provided with at least one chemical suppressor.

8. Screening machine as in claim 7, wherein said at least one pipe of said at least one explosion anti-propagation device is attached to a first lateral wall of said plurality of perimeter walls, wherein said at least one pipe of said at least one additional explosion anti-propagation device is attached to a second lateral wall of said plurality of perimeter walls, and wherein said first lateral wall and said second lateral wall are opposite one another.

9. Screening machine as in claim 1, wherein said at least one pipe is disposed along at least one lateral wall of said plurality of perimeter walls, and wherein said delivery nozzles are disposed at different heights.

10. Screening machine as in claim 1, wherein each of said delivery nozzles is disposed between two screening surfaces or between one screening surface and said upper or bottom wall.

11. Screening machine as in claim 7, wherein said chemical suppressors are positioned in an array on said upper wall.

12. Screening machine as in claim 11, wherein said screening box comprises a first row of chemical suppressors and a second row of chemical suppressors.

13. Screening machine as in claim 2, wherein said at least one chemical suppressor is attached to said upper wall of said screening box.

14. Screening machine as in claim 8, wherein said chemical suppressors are positioned in an array on said upper wall.

* * * * *